(12) United States Patent
Giddings et al.

(10) Patent No.: US 6,739,155 B1
(45) Date of Patent: May 25, 2004

(54) QUARTZ MAKING AN ELONGATED FUSED QUARTZ ARTICLE USING A FURNACE WITH METAL-LINED WALLS

(75) Inventors: Robert Arthur Giddings, Slingerlands, NY (US); Frederic Francis Ahlgren, Highland Heights, OH (US)

(73) Assignee: General Electric Company, Schenectady, NY (US)

( * ) Notice: Subject to any disclaimer, the term of this patent is extended or adjusted under 35 U.S.C. 154(b) by 481 days.

(21) Appl. No.: 09/636,286

(22) Filed: Aug. 10, 2000

(51) Int. Cl.⁷ .............................................. C03B 37/02
(52) U.S. Cl. ............................ 65/401; 65/404; 65/405; 65/493
(58) Field of Search .................... 65/401, 404, 405, 65/493

(56) References Cited

U.S. PATENT DOCUMENTS

| | | | |
|---|---|---|---|
| 4,078,909 A | * 3/1978 | Dietzsch et al. | 65/393 |
| 4,178,165 A | * 12/1979 | Jung | 65/144 |
| 4,350,513 A | * 9/1982 | Coucoulas et al. | 65/29.12 |
| 4,365,986 A | * 12/1982 | Nayak | 65/29.21 |
| 4,365,987 A | * 12/1982 | Boettner | 65/137 |
| 4,404,009 A | * 9/1983 | Bhatti et al. | 65/475 |
| 4,430,109 A | * 2/1984 | Palmquist | 65/32.1 |
| 4,617,041 A | * 10/1986 | Meerman | 65/385 |
| 5,059,229 A | * 10/1991 | Blankenship et al. | 65/424 |
| 5,096,479 A | * 3/1992 | Allen et al. | 65/30.1 |
| 5,785,729 A | * 7/1998 | Yokokawa et al. | 65/385 |
| 6,162,552 A | * 12/2000 | Bewlay et al. | 428/655 |
| 6,422,861 B1 | * 7/2002 | Antczak et al. | 432/13 |
| 6,632,086 B1 | * 10/2003 | Antczak et al. | 432/13 |

FOREIGN PATENT DOCUMENTS

| | | | | |
|---|---|---|---|---|
| EP | 0004183 | * | 9/1979 | 65/405 |
| GB | 2054552 | * | 2/1981 | 65/405 |

* cited by examiner

Primary Examiner—John Hoffmann
(74) Attorney, Agent, or Firm—Andrew J. Caruso; Philip D. Freedman

(57) ABSTRACT

A crucible for melting a silica for fusion of said silica into a desired shape. The crucible having a main body with inner and outer surfaces comprised of a refractory material. In addition, at least a portion of the inner surface includes a barrier layer comprised of a material selected from rhenium, osmium, iridium, and mixtures thereof. An inlet tube to the crucible being provided to supply an oxidizing gas to a melt zone.

9 Claims, 2 Drawing Sheets

QUARTZ MAKING AN ELONGATED FUSED QUARTZ ARTICLE USING A FURNACE WITH METAL-LINED WALLS

BACKGROUND OF THE INVENTION

The present invention relates to a method and apparatus for the production of tubing, rods and the like from crystalline quartz or other glass like materials. Particularly, this invention relates to a method and apparatus for use in the production of elongated quartz members from a silica melt. The present invention is particularly directed to the manufacture of fused silica tubes for use in the manufacture of optical fibers.

Various types of elongated members have been formed continuously by melting of quartz crystal or sand in an electrically heated furnace whereby the desired shape is drawn from the furnace through a suitable orifice or die in the bottom of the furnace as the raw material is melted. One apparatus for continuous production of fused quartz tubing, for example, is a tungsten-lined molybdenum crucible supported vertically and having a suitable orifice or die in the bottom to draw cane, rods, or tubing. The crucible is surrounded by an arrangement of tungsten heating elements or rods which heat the crucible. The crucible, together with its heating unit, is encased in a refractory chamber supported by a water-cooled metal jacket. The crucible is heated in a reducing atmosphere of nitrogen and hydrogen.

An alternative apparatus provides fused quartz tubing by feeding natural quartz crystal into a refractory metal crucible heated by electrical resistance under a particular gas atmosphere to reduce the bubble content. The bubbles formed by gas entrapment between crystals and the molten viscous mass of fused quartz do not readily escape from the molten glass and, hence, remain as bubbles or lines in the product drawn from the fused quartz melt. By substituting a melting atmosphere gas which readily diffuses through the molten material (such as pure helium, pure hydrogen or mixtures of these gases) the gas pressure in the bubbles was reduced and thereby the bubble size was reduced. This process uses a mixture of 80% helium and 20% hydrogen by volume.

In a further alternative method, a product is obtained by continuously feeding a raw material of essentially pure silicon dioxide in particulate form into the top section of an induction-heated crucible, fusing the raw material continuously in an upper-induction heat zone of the crucible in an atmosphere of hydrogen and helium while maintaining a fusion temperature not below approximately 2050° C. The fused material in the lower zone of the crucible is heated by separate induction heating means to produce independent regulation of the temperature in the fused material. The fused material is continuously drawn from the lower zone of the crucible through forming means in the presence of an atmosphere of hydrogen containing a non-oxidizing carrier gas.

Unfortunately, most of the refractory metal and non-metal materials used in the crucibles of the above-described apparatus are undesirable impurities if present in the drawn silica article. Such refractory material contamination causes discoloration and occlusions in the silica glass. Furthermore, the presence of refractory material particles (e.g. 1–10 $\mu$m) can degrade the strength of the resultant silica article. Moreover, the particles become a flaw in the drawn article that can cause the strand to break.

Accordingly, there is a need in the art to reduce contamination of fused glass occurring from the refractory materials used in constructing the furnace. This need has increased recently as semiconductor and fiber optics manufacturing processes, a primary use for the glass products obtained from the subject process, have required higher levels of purity and performance.

Unfortunately, because the furnace is typically constructed of the refractory materials, the manufacturing plant is usually contaminated therewith. Accordingly, even a furnace having melting and drawing zones insulated from refractory materials cannot fully prevent contamination. It would therefore be desirable to have available a method for removing and/or reducing the effect of refractory materials contamination on the strength of the resultant silica article.

BRIEF SUMMARY OF THE INVENTION

In an exemplary embodiment of the invention, a method for forming an elongated fused quartz article is provided. The method generally comprises feeding a silica or quartz ($SiO_2$) material into a furnace. The $SiO_2$ material is fused in a melting zone of the furnace under a gas atmosphere including a carrier gas and at least one oxidizing gas. The article is then drawn from the furnace.

In an exemplary embodiment of the invention, a furnace for melting of the silica and subsequent drawing into a desired shape is comprised of a body having an outer surface constructed of a refractory metal and including a inner lining in at least the melt zone of the furnace of a non-reactive barrier material. The inner lining is preferably formed of rhenium, osmium, iridium, platinum or mixtures thereof. Preferably, the furnace will include an inlet tube for introduction of a carrier gas and an oxidizing gas to the melt zone.

The present crucible construction provides a number of advantages over the prior art. Particularly, furnaces constructed with rhenium, iridium, platinum and/or osmium lined crucibles produce products with much lower levels of refractory metal in the solution. For example, the metal dissolved in the silica can be reduced to below 10 ppb, preferably below 1 ppb, and preferably below the current level of detection via NAA. This reduced amount of refractory metal contamination in the silica melt improves the chemical composition of the silica glass allowing for a decrease in discoloration and surface haze. Furthermore, utilization of a furnace equipped with a crucible including the non-reactive lining allows operation at optimum temperature ranges. Operation at these optimum temperatures may achieve better fining. Moreover, operation at optimum fusion temperatures will increase solubility of gaseous species in the raw material, thus reducing airline defects in the drawn products.

Similarly, the present inventive crucible will also help to further reduce the presence of haze and discoloration in the resultant glass products. In addition, the present inventive furnace allows for the use of an oxidizing atmosphere in the melt zone. Previously, oxidizing agents in the melt zone were avoided because of their negative impact on the refractory walls of the crucible, particularly on tungsten and molybdenum.

It should be noted that the terms "quartz" and "silica" are used interchangeably throughout this application, both being directed generally to the compound $SiO_2$. Nonetheless, the present invention encompasses the use of any raw material introduced to the melting furnace, including but not limited to natural silica/quartz and synthetic silica.

BRIEF DESCRIPTION OF THE DRAWINGS

The structure, operation and advantages of the present preferred embodiment of this invention will become further apparent upon consideration of the following description, taken in conjunction with the accompanying drawings, wherein.

DETAILED DESCRIPTION OF THE INVENTION

Figure 1:
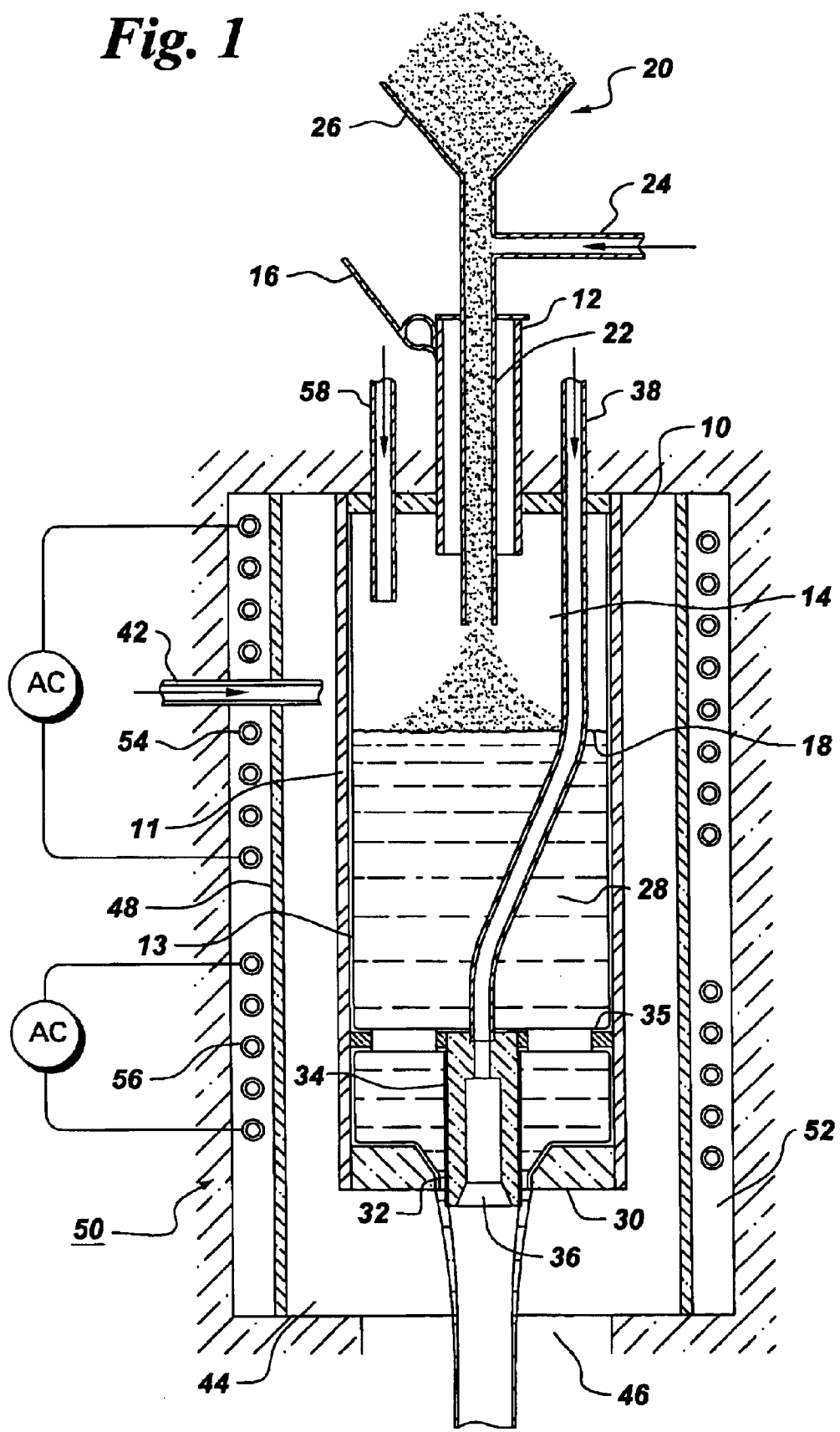
FIG. 1 is a longitudinal sectional view of a furnace of the present invention.

In one of its preferred embodiments, the fused quartz product of the present invention can be formed in a furnace configuration having the features shown in FIG. 1. The furnace has a general cylindrical shape. Preferably, an elongated cylindrical melting crucible 10 constructed of a refractory metal layer 11, such as tungsten or molybdenum as well as combinations thereof, is used. The melting crucible 10 further includes a lining of rhenium 13 over the refractory metal layer 11.

A purified sand raw material is fed through a top opening 12 into a melt zone 14 of the crucible member. The top opening 12 is provided with movable closure means 16, such as a trapdoor which can be kept closed except for observing the level of the melt 18 and during feeding of the raw material into the crucible. Automatic feeder means 20 are provided at the top opening of the crucible member to maintain a predetermined level of the raw material in the crucible. The feeder includes a discharge tube 22 having its outlet opening located in the crucible 10 so as to provide the raw material in an upper region where melting takes place, a purge gas inlet tube 24 and reservoir means 26 which contains a supply of the raw material being fed automatically to the discharge tube.

The purge gas being supplied to the feeder helps eliminate gases contained in the raw material which could otherwise form bubbles in the fused quartz melt which cannot thereafter be removed or minimized in a manner to be described in part immediately hereinafter. The composition of the purge gas is generally a gas mixture of hydrogen and helium in the volume ratios 40–100% hydrogen and 60–0% helium.

The lower portion 28 (a drawing zone) of the crucible 10 includes an annular ring 30 having central opening 32 through which the elongated fused quartz member is continuously formed by drawing the viscous material through the opening. A core 34 is centrally disposed in the opening 32 and extends below—but could extend above—the means of forming tubing from the viscous material being drawn from the melt. As known by the skilled artisan, the position of the core can be shifted as necessary to produce the desired size of extrudate. Support element 35 is affixed to the wall of the crucible and provides rigid support of the core which helps to maintain a constant size opening from which the product is being drawn. The core is fabricated with a hollow interior 36 which is connected to inlet pipe 38 so that a supply of non-oxidizing gas can be furnished as a forming atmosphere while the tubing 40 is being drawn.

A second inlet pipe 42 supplies what can be a mixture of hydrogen in a non-oxidizing carrier gas such as argon or nitrogen in volume ratios 1–20% hydrogen and 99–80% carrier gas as a protective atmosphere which surrounds the exterior refractory metal wall 11 of the crucible 10. This supply of gas is provided to annular space 44 which provides a housing means for the crucible and includes a central bottom opening 46 providing exhaust means from the cavity for the gas in a manner which envelops the exterior surface of the elongated fused quartz member 40 being drawn from the furnace. The exterior wall of the annular space comprises a refractory cylinder 48 which in combination with exterior housing 50 of the furnace construction serves as the container means for the induction heating coils of the apparatus. More particularly, a concentric passageway 52 is defined between the exterior wall of the refractory cylinder 48 and the interior wall of housing 50 in which is disposed two helical-shaped induction heating coils 54 and 56 supplying separate heating sources for the upper and lower zones of the crucible, respectively. Of course, additional coils may be employed as governed by the size of the furnace, for example, it may be beneficial to include additional coil(s) in the finish zone. In any case, the heating sources and the power supplies thereto can be of conventional construction.

A third supply pipe 58 is located in the top section of exterior housing 50, passing into the crucible 10, allowing a gas mixture to be fed to the melt zone 14 of the crucible. This gas mixture is generally an inert carrier gas in combination with an oxidizing gas. The preferred carrier gas is selected from hydrogen, helium and the other noble gases and the preferred oxidizing gas is water vapor or air. Preferably, in the case of hydrogen and water vapor, the oxidizing gas fed to the melt Zone 14 will be a hydrogen with a dew point of greater than 30° C., more preferably, greater than 50°.

The preferred form of the present invention includes the rhenium lining 13 which enables the introduction of the oxidizing gas. Moreover, since the refractory metals forming the walls of the crucible are usually rapidly oxidized and degraded at the temperature of furnace operation, it is beneficial to protect them from the oxidizing atmosphere in the melt zone. Of course, any material suitable to this purpose can be used, such as rhenium, osmium, iridium and mixtures thereof.

In prior processes, the presence of hydrogen in the melt zone to protect the refractory materials also resulted in the Mo/W oxides being reduced and remaining in the melt as metal particles causing a loss of strength in the drawn articles. The presence of oxidizing gas (e.g. water vapor) will keep or convert the refractory metal oxides to that complexed state, resulting in their discharge as volatile gases or becoming solubilized into the melt with little negative impact.

Of course, the present inventive method and use of a non-reactive crucible lining in the melt zone is not limited to the furnace or crucible shown in FIG. 1.

In accordance with carrying out the process of the present invention in the above-described apparatus, a natural silica sand having a nominal particle size of—50 mesh U.S. screen size which has been purified by chemical treatment to the nominal impurity content below is supplied to the top opening of the crucible member in the apparatus. Alternatively, a synthetic silica can be used.

| | RAW MATERIAL | |
|---|---|---|
| Impurity | Natural (p.p.m.) | Synthetic (p.p.m.) |
| $Fe_2O_3$ | 1 | 0.07 |
| $TiO_2$ | 2 | <.02 |
| $Al_2O_3$ | 20 | 100 |
| CaO | 0.4 | <.01 |
| MgO | 0.1 | <.05 |
| $K_2O$ | 0.6 | 0.1 |
| $Na_2O$ | 0.7 | 0.1 |

-continued

RAW MATERIAL

| Impurity | Natural (p.p.m.) | Synthetic (p.p.m.) |
|---|---|---|
| $Li_2O$ | 0.6 | <.05 |
| B | <0.2 | — |
| $ZrO_2$ | <1.0 | <.02 |

The above raw material is provided to the crucible member which has been heated in excess of 2050° C. while also being supplied with the hydrogen and helium gas mixture hereinbefore specified. After a predetermined melt level of fused quartz has been established in the crucible and the molten material caused to flow by gravity through central bottom opening 32 in the crucible member, tubing or rod is then drawn continuously by the drawing machine (not shown) in the presence of a forming gas atmosphere as hereinbefore specified. The above-described furnace is operated in connection with conventional tube or rod drawing machinery which has been omitted from the drawing as forming no part of the present invention. In any continuous drawing of tubing/rod in the foregoing described manner, the electrical power being supplied to the lower heating coil 56 is typically maintained at a lower level than the electrical power being supplied to the upper heating coil 54 in order to lower the temperature of the material as it is being drawn to below a temperature of 2050° C. However, the use of a non-reactive lining in the finish zone can allow higher temperature operation if desired.

As stated above, the internal surface of the furnace crucible 10 includes a non-reactive (e.g. rhenium, osmium, platinum or iridium) sheet or coating 13. The coating 13 may be applied to the refractory metal layer 11 by chemical vapor deposition, electrolysis, plasma spray or any other technique known to the skilled artisan (hereinafter referred to as "chemical bonding"). The non-reactive layer 13 may also be physically attached to the refractory metal layer 11 by attaching a sheet directly to the wall of the crucible with rivets, bolts, screws, etc., preferably constructed from the same or similar material as the non-reactive lining itself. Alternatively, a properly shaped rhenium sleeve can be inserted into the crucible. In fact, a combination of coating or lining methods may be used depending on the geometric complexity of the segments comprising the crucible assembly.

Figure 2:
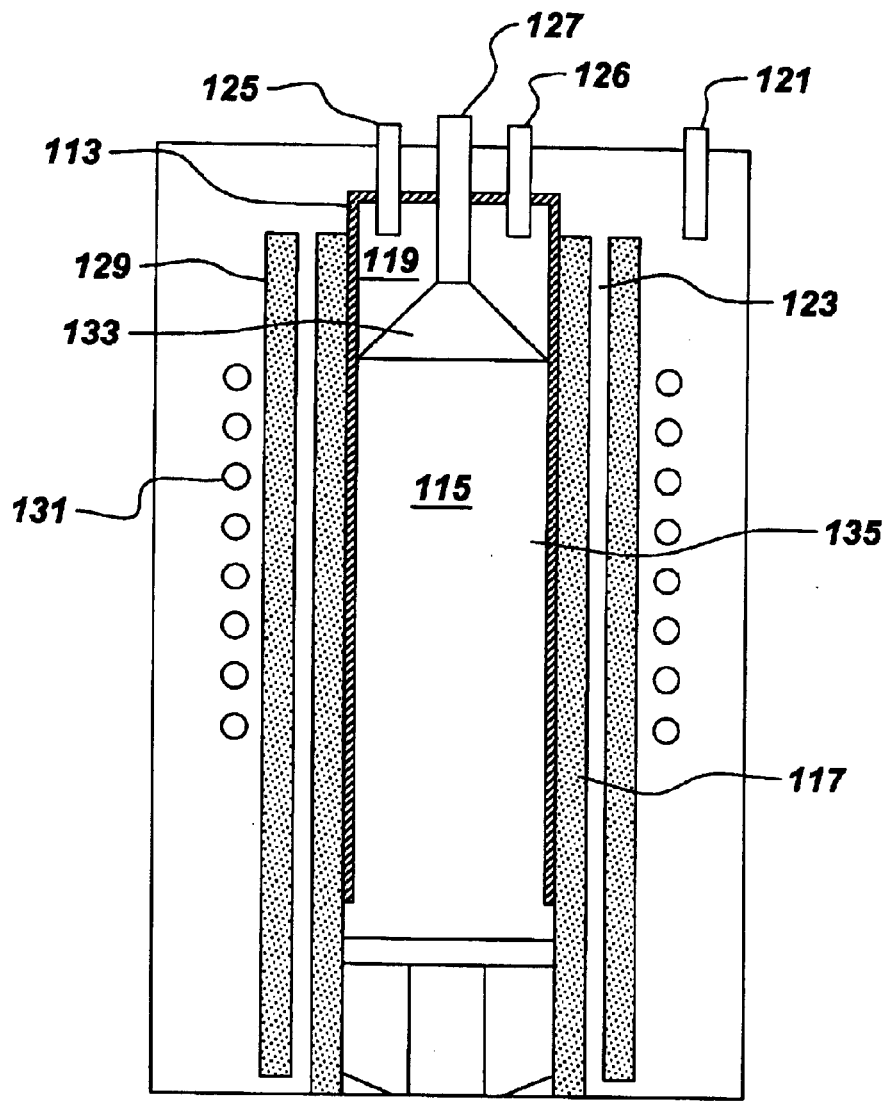
FIG. 2 is a schematic view of a furnace demonstrating the present inventive construction.

Referring now to FIG. 2, an alternative embodiment of the present invention is demonstrated. Moreover, a sealed cup of rhenium 113 is located around and above the melt/fusion zone 115. This position of the cup 113 shields the tungsten walls 117 of the crucible from the atmosphere 119 in the melt zone 115. This protection is supplemented by feeding a dry hydrogen gas through tube 121 to the space 123 between cup 113 and walls 117. A tube 125 is provided to feed wet hydrogen into the melt zone 115, and a tube 126 is provided to exhaust wet hydrogen gas. Of course, proper seals are provided between tube 125 and sand feed tube 127 to create a gas barrier within cup 113. As is conventional in the art, a layer of insulation 129 is disposed between tungsten walls 117 and the induction heating coils 131. As shown in this embodiment, feed sand 133 is beneficially in a wet hydrogen environment 119 as it fuses into a molten state 135 for eventual product forming.

Figure 3:
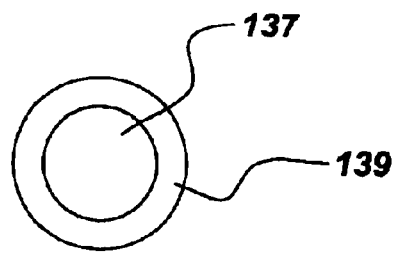
FIG. 3 is a cross-sectional view of a typical optical fiber.

Referring now to FIG. 3, an optical fiber of the present invention is shown, comprising an optical fiber core 137 surrounded by a sheath 139 of silica formed via the present inventive process.

While the invention has been described by reference to preferred embodiments, it will be understood by those skilled in the art that various changes may be made and equivalents may be substituted for elements without departing from the scope of the invention. In addition, any modifications may be made to adapt a particular situation or material to the teachings of the invention without departing from the essential scope thereof. Therefore, it is intended that the invention not be limited to the particular embodiment disclosed as the best mode contemplated for carrying out this invention, but the invention will include all embodiments falling within the scope of appended claims.

What is claimed is:

1. A method for forming an elongated fused quartz article comprising:

feeding a $SiO_2$ material into a furnace melting zone comprising a refractory material wall comprising tungsten, molybdenum or mixtures thereof with a protective lining selected from the group consisting of rhenium, osmium, iridium and mixtures thereof;

feeding a gas mixture comprising at least (1) one inert carrier gas comprising a member selected from the group consisting of a hydrogen carrier gas and a noble carrier gas and (2) an oxidizing gas into the protectively lined furnace melting zone;

fusing the $SiO_2$ material in the protectively lined melting zone of the furnace in the presence of the gas mixture; and drawing the fused $SiO_2$ material from the furnace to form the fused quartz article.

2. The method of claim 1, wherein the oxidizing gas is water vapor or air.

3. The method of claim 1, wherein the oxidizing gas is water vapor.

4. The method of claim 1, wherein the oxidizing gas is air.

5. The method of claim 1, wherein the gas mixture comprises hydrogen with a dew point of greater than 50° C.

6. The method of claim 1, wherein said protective lining comprises rhenium.

7. The method of claim 1, comprising drawing a fused $SiO_2$ material having less than 10 ppb dissolved refractory metal content from the furnace.

8. The method of claim 1, comprising drawing a fused $SiO_2$ material having less than 1 ppb dissolved refractory metal content from the furnace.

9. The method of claim 1, comprising fusing the $SiO_2$ material at a temperature in excess of 2050° C.

* * * * *